US008544277B2

(12) United States Patent
Johnson et al.

(10) Patent No.: US 8,544,277 B2
(45) Date of Patent: Oct. 1, 2013

(54) TURBULATED AFT-END LINER ASSEMBLY AND COOLING METHOD

(75) Inventors: Thomas Edward Johnson, Greer, SC (US); Patrick Melton, Horse Shoe, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/018,886

(22) Filed: Feb. 1, 2011

(65) Prior Publication Data

US 2011/0120135 A1 May 26, 2011

Related U.S. Application Data

(63) Continuation-in-part of application No. 11/905,238, filed on Sep. 28, 2007, now abandoned.

(51) Int. Cl.
*F02C 1/00* (2006.01)

(52) U.S. Cl.
USPC .............................................. 60/752; 60/758

(58) Field of Classification Search
USPC .................................................. 60/752–760
See application file for complete search history.

(56) References Cited

U.S. PATENT DOCUMENTS

| | | | | |
|---|---|---|---|---|
| 4,292,810 | A | 10/1981 | Glenn | |
| 4,838,031 | A | 6/1989 | Cramer | |
| 5,024,058 | A * | 6/1991 | Shekleton et al. | 60/752 |
| 5,460,002 | A | 10/1995 | Correa | |
| 5,653,110 | A | 8/1997 | Lee et al. | |
| 6,098,397 | A | 8/2000 | Glezer et al. | |
| 6,772,595 | B2 | 8/2004 | Martling et al. | |
| 7,007,482 | B2 | 3/2006 | Green et al. | |
| 7,010,921 | B2 | 3/2006 | Intile et al. | |
| 7,681,403 | B2 | 3/2010 | Johnson et al. | |
| 2002/0108375 | A1 | 8/2002 | Johnson et al. | |
| 2002/0148228 | A1 * | 10/2002 | Kraft et al. | 60/772 |
| 2005/0144953 | A1 | 7/2005 | Martling et al. | |
| 2005/0262844 | A1 * | 12/2005 | Green et al. | 60/752 |
| 2005/0268613 | A1 | 12/2005 | Intile et al. | |
| 2005/0268615 | A1 | 12/2005 | Bunker et al. | |
| 2005/0268617 | A1 * | 12/2005 | Amond et al. | 60/776 |
| 2006/0010874 | A1 | 1/2006 | Intile et al. | |
| 2006/0168965 | A1 | 8/2006 | Green et al. | |
| 2010/0186415 | A1 | 7/2010 | Brown et al. | |

* cited by examiner

*Primary Examiner* — Gerald L Sung
(74) *Attorney, Agent, or Firm* — Nixon & Vanderhye P.C.

(57) ABSTRACT

A combustor of a turbine engine includes a portion where the aft end of a combustor liner is sealed to a forward end of a transition piece. A cover sleeve surrounds the aft end portion of the combustor liner to form an annular airflow passage between the exterior of the combustor liner and the inner side of the cover sleeve. A plurality of turbulators project radially outward from the combustor liner. One or more circumferential rows of supports also extend radially outward from the combustor liner to support the cover sleeve.

15 Claims, 6 Drawing Sheets

TURBULATED AFT-END LINER ASSEMBLY AND COOLING METHOD

This application is a continuation-in-part of U.S. application Ser. No. 11/905,238 filed Sep. 28, 2007, now abandoned the entire contents of which are hereby incorporated by reference.

BACKGROUND OF THE INVENTION

This invention relates to internal cooling within a gas turbine engine; and more particularly, to an assembly and method for providing better and more uniform cooling in a transition region between a combustion section and discharge section of the turbine.

Traditional gas turbine combustors use diffusion (i.e., non-premixed) combustion in which fuel and air enter the combustion chamber separately. The process of mixing and burning produces flame temperatures exceeding 3900° F. Since conventional combustors and/or transition pieces having liners are generally capable of withstanding a maximum temperature on the order of only about 1500° F. for about ten thousand hours (10,000 hrs), steps to protect the combustor and/or transition piece must be taken. This has typically been done by film-cooling, which involves introducing relatively cool compressor air into a plenum formed by the combustor liner surrounding the outside of the combustor. In this prior arrangement, the air from the plenum passes through louvers in the combustor liner and then passes as a film over the inner surface of the liner, thereby maintaining combustor liner integrity.

Because diatomic nitrogen rapidly disassociates at temperatures exceeding about 3000° F. (about 1650° C.), the high temperatures of diffusion combustion result in relatively large NOx emissions. One approach to reducing NOx emissions has been to premix the maximum possible amount of compressor air with fuel. The resulting lean premixed combustion produces cooler flame temperatures and thus lower NOx emissions. Although lean premixed combustion is cooler than diffusion combustion, the flame temperature is still too hot for prior conventional combustor components to withstand.

Furthermore, because the advanced combustors premix the maximum possible amount of air with the fuel for NOx reduction, little or no cooling air is available, making film-cooling of the combustor liner and transition piece difficult at best. Nevertheless, combustor liners require active cooling to maintain material temperatures below limits. In dry low NOx (DLN) emission systems, this cooling can only be supplied as cold side convection. Such cooling must be performed within the requirements of thermal gradients and pressure loss. Thus, means such as thermal barrier coatings in conjunction with "backside" cooling have been considered to protect the combustor liner and transition piece from destruction by such high heat. Backside cooling involved passing the compressor discharge air over the outer surface of the transition piece and combustor liner prior to premixing the air with the fuel.

With respect to the combustor liner, one current practice is to impingement cool the liner, or to provide turbulators on the exterior surface of the liner (see U.S. Pat. No. 7,010,921). Another practice is to provide an array of concavities on the exterior or outside surface of the liner (see U.S. Pat. No. 6,098,397). The various known techniques enhance heat transfer but with varying effects on thermal gradients and pressure losses. Turbulation works by providing a blunt body in the flow which disrupts the flow creating shear layers and high turbulence to enhance heat transfer on the surface. Dimple concavities function by providing organized vortices that enhance flow mixing and scrub the surface to improve heat transfer.

BRIEF DESCRIPTION OF THE INVENTION

The above discussed and other drawbacks and deficiencies are overcome or alleviated in an example embodiment by an apparatus for cooling a combustor liner and transition piece of a gas turbine.

The invention may be embodied in a combustor for a turbine comprising: a combustor liner; a first flow sleeve surrounding said combustor liner with a first flow annulus therebetween, said first flow sleeve having a plurality of cooling apertures formed about a circumference thereof for directing compressor discharge air as cooling air into said first flow annulus; a transition piece body connected to said combustor liner, said transition piece body being adapted to carry hot combustion gases to the turbine; a second flow sleeve surrounding said transition piece body, said second flow sleeve having a second plurality of cooling apertures for directing compressor discharge air as cooling air into a second flow annulus between the second flow sleeve and the transition piece body, said first flow annulus connecting to said second flow annulus; a resilient seal structure disposed radially between an aft end portion of said combustor liner and a forward end portion of said transition piece body; and a cover sleeve disposed between said aft end portion of said combustor liner and said resilient seal structure, an air flow passage being defined between said cover sleeve and said aft end portion of said combustor liner, said cover sleeve having at a forward end thereof a plurality of air inlet feed holes for directing cooling air from said first annulus into said air flow passage, a radially outer surface of said combustor liner aft end portion defining said air flow passage including a plurality of turbulators projecting towards but spaced from said cover sleeve and a plurality of supports extending to and engaging said cover sleeve to space said cover sleeve from said turbulators to define said air flow passage.

The invention may also be embodied in a turbine engine comprising: a combustion section; an air discharge section downstream of the combustion section; a transition region between the combustion and air discharge sections; a combustor liner defining a portion of the combustion section and transition region; a first flow sleeve surrounding said combustor liner with a first flow annulus therebetween, said first flow sleeve having a plurality of rows of cooling apertures formed about a circumference of said first flow sleeve for directing compressor discharge air as cooling air into said first flow annulus; a transition piece body connected to at least one of said combustor liner and said first flow sleeve, said transition piece body being adapted to carry hot combustion gases to a stage of the turbine corresponding to the air discharge section; a second flow sleeve surrounding said transition piece body, said second flow sleeve having a second plurality of rows of cooling apertures for directing compressor discharge air as cooling air into a second flow annulus between the second flow sleeve and the transition piece body, said first flow annulus connecting to said second flow annulus; a resilient seal structure disposed radially between an aft end portion of said combustor liner and a forward end portion of said transition piece body; and a cover sleeve disposed between said aft end portion of said combustor liner and said resilient seal structure, an air flow passage being defined between said cover sleeve and said aft end portion of said combustor liner, said cover sleeve having at a forward end thereof a plurality of air inlet feed holes for directing cooling air from said first annulus into said air flow passage, a radially outer surface of said combustor liner aft end portion defining said air flow passage including a plurality of turbulators projecting towards but spaced from said cover sleeve and a plurality of supports extending to and engaging said cover sleeve to space said cover sleeve from said turbulators to define said air flow passage.

The invention may also be embodied in a method of cooling a transition region between a combustion section comprising a combustor liner and a first flow sleeve surrounding said combustor liner with a first flow annulus therebetween, said first flow sleeve having a plurality of cooling apertures formed about a circumference thereof for directing compressor discharge air as cooling air into said first flow annulus, and a transition region comprising a transition piece body connected to said combustor liner, said transition piece body being adapted to carry hot combustion gases to a turbine, a second flow sleeve surrounding said transition piece body, said second flow sleeve having a second plurality of cooling apertures for directing compressor discharge air as cooling air into a second flow annulus between the second flow sleeve and the transition piece body, said first flow annulus connecting to said second flow annulus; said transition region including a resilient seal structure disposed radially between an aft end portion of said combustor liner and a forward end portion of said transition piece body; the method comprising: configuring said aft end portion of said combustor liner so that a radially outer surface thereof includes a plurality of radially outwardly projecting turbulators and a plurality of radially outwardly projecting supports having a radial height greater than that of said turbulators; disposing a cover sleeve between said aft end portion of said combustor liner and said resilient seal structure to define an air flow passage between said cover sleeve and said aft end portion of said combustor liner, said cover sleeve having at a forward end thereof a plurality of air inlet feed holes for directing cooling air from said first annulus into said cooling air passage, said turbulators projecting towards but being spaced from said cover sleeve and said supports extending to and spacing said cover sleeve from said turbulators to define said air flow passage; and supplying compressor discharge air through at least some of said cooling apertures to and through said air inlet feed holes and through said air flow passage to reduce a temperature in a vicinity of said resilient seal.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
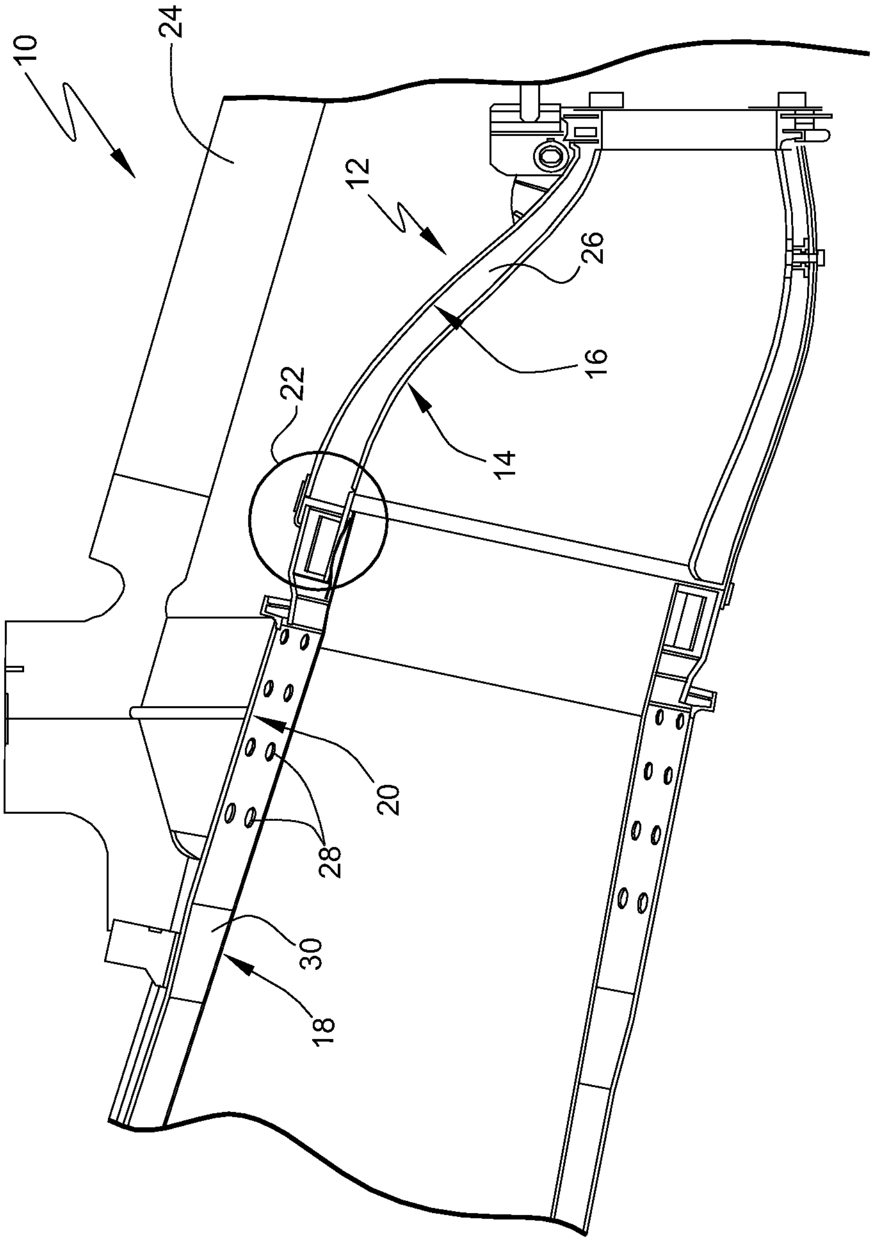
FIG. 1 is a partial schematic illustration of a gas turbine combustor section.

FIG. 1 schematically depicts the aft end of a combustor in cross-section. As can be seen, in this example, the transition piece 12 includes a radially inner transition piece body 14 and a radially outer transition piece impingement sleeve 16 spaced from the transition piece body 14. Upstream thereof is the combustion liner 18 and the combustor flow sleeve 20 defined in surrounding relation thereto. The encircled region is the transition piece forward sleeve assembly 22.

Flow from the gas turbine compressor (not shown) enters into a case 24. About 40-60% of the compressor discharge air passes through apertures (not shown in detail) formed along and about the transition piece impingement sleeve 16 for flow in an annular region or annulus 26 between the transition piece body 14 and the radially outer transition piece impingement sleeve 16. The remaining compressor discharge flow passes through flow sleeve apertures 28 in the combustion liner cooling sleeve 20 and into an annulus 30 between the cooling sleeve 20 and the liner 18. This flow of air mixes with the air from the downstream annulus 26, and it is eventually directed into the fuel injectors inside the combustor liner 18, where it mixes with the gas turbine fuel and is burned.

In the embodiment illustrated in FIG. 1, the apertures 28 in the combustor flow sleeve 20 are shown as holes. In alternate embodiments, the apertures could have other shapes. For example, the apertures that admit air into the annulus 30 could be slots that extend around the circumference of the combustor flow sleeve 20.

Figure 2:
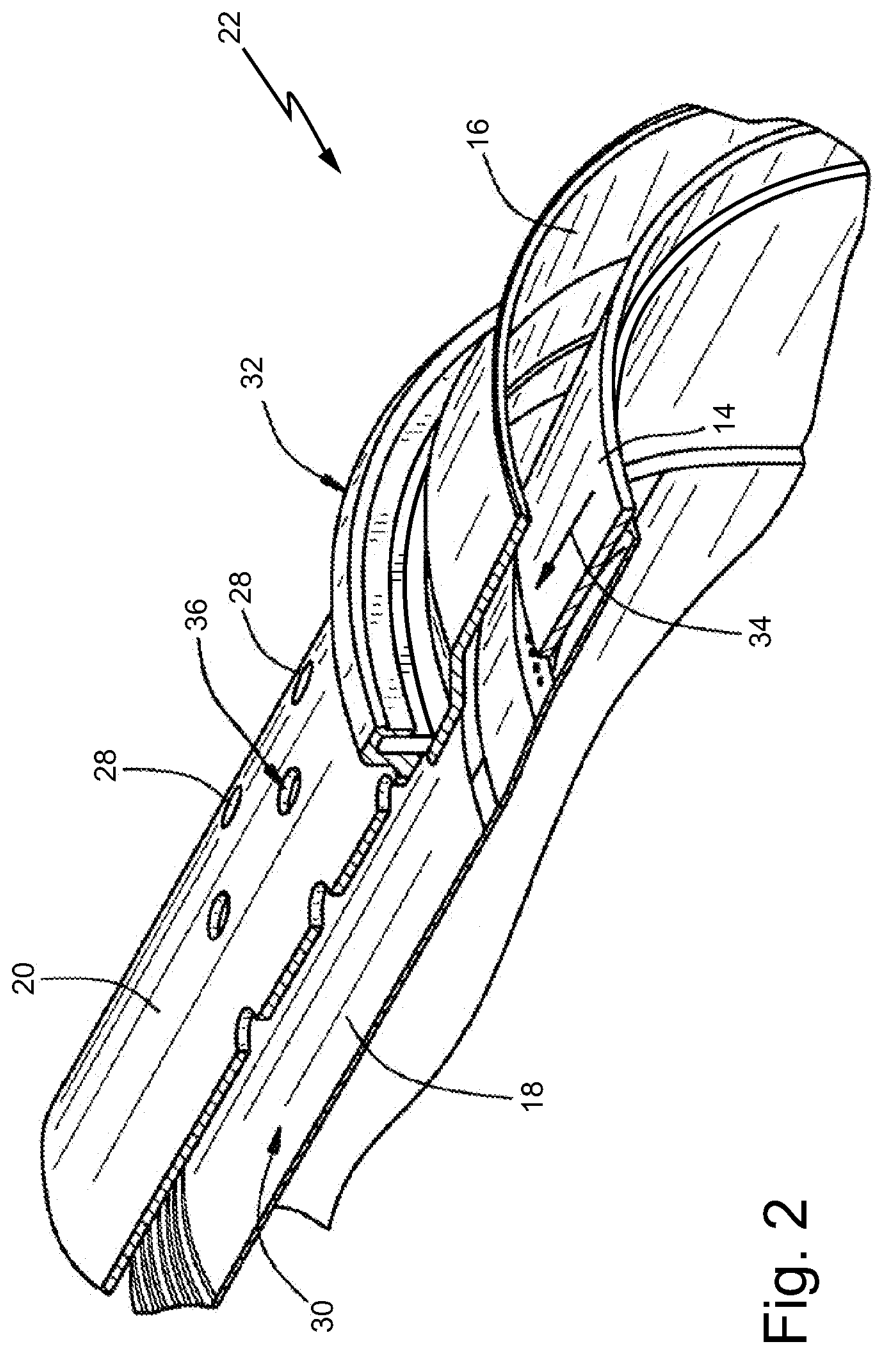
FIG. 2 is a partial but more detailed perspective of a conventional combustor liner and flow sleeve joined to the transition piece.

FIG. 2 illustrates the connection at 22 between the transition piece 14, 16 and the combustor flow sleeve 18, 20. Specifically, the impingement sleeve (or second flow sleeve) of the transition piece 14 is received in telescoping relationship in a mounting flange 32 on the aft end of the combustor flow sleeve 20 (or first flow sleeve). The transition piece 14 also receives the combustor liner 18 in a telescoping relationship. The combustor flow sleeve 20 surrounds the combustor liner 18 creating flow annulus 30 (or first flow annulus) therebetween. It can be seen from the flow arrow 34 in FIG. 2, that crossflow cooling air traveling in annulus 26 continues to flow into annulus 30 in a direction perpendicular to impingement cooling air flowing through the cooling apertures 28 (see flow arrow 36) formed about the circumference of the flow sleeve 20. While three rows of apertures are shown in FIG. 2, the flow sleeve may have any number of rows of apertures. Also, as noted above, the apertures could be holes, or they could have other shapes, such as circumferential slots.

Still referring to FIGS. 1 and 2, a typical can annular reverse-flow combustor is shown for a turbine that is driven by the combustion gases from a fuel where a flowing medium with a high energy content, i.e., the combustion gases, produces a rotary motion as a result of being deflected by rings of blading mounted on a rotor. In operation, discharge air from the compressor (compressed to a pressure on the order of about 250-400 lb/in$^2$) reverses direction as it passes over the outside of the combustor liners (one shown at 18) and again as it enters the combustor liner 18 en route to the turbine. Compressed air and fuel are burned in the combustion chamber, producing gases with a temperature of about 2800° F. These combustion gases flow at a high velocity into turbine section via transition piece 14.

Figure 3:
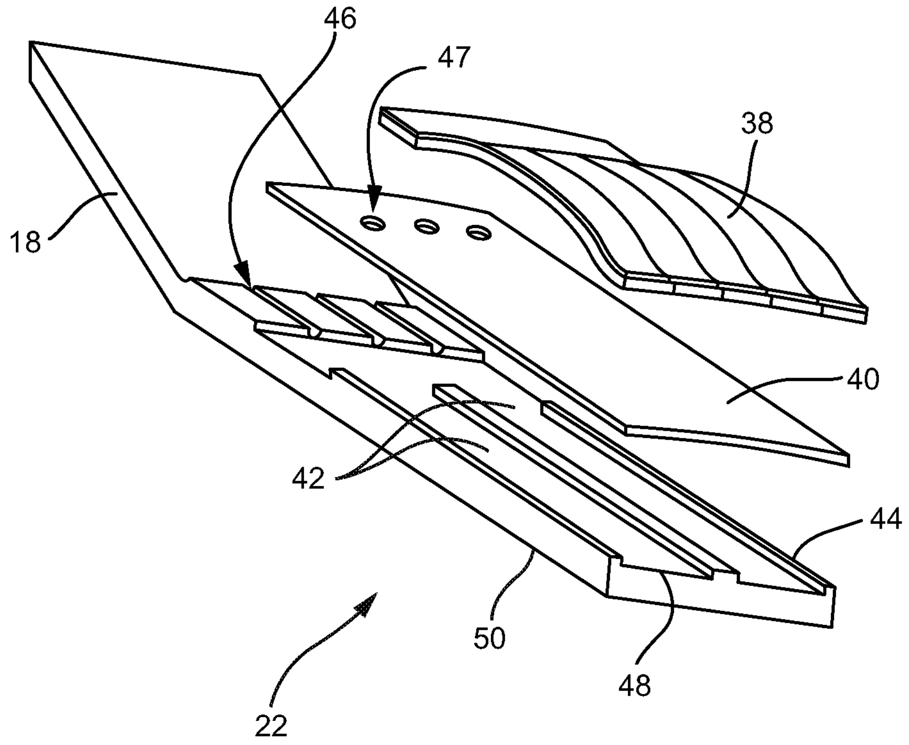
Fig.3 Prior Art
FIG. 3 is an exploded partial perspective view of the aft end of a conventional combustor liner.

There is a transition region indicated generally at 22 in FIG. 1 between the combustion section and the transition piece. As previously noted, the hot gas temperature at the aft end of section 18, the inlet portion of region 22, is on the order of about 2800° F. However, the liner metal temperature at the downstream, outlet portion of region 22 is preferably on the order of 1400-1550° F. With reference to FIG. 3, to help cool the liner to this lower metal temperature range, during passage of heated gases through region 22, the aft end 50 of the liner defines passage(s) through which cooling air is flowed. The cooling air serves to draw off heat from the liner and thereby significantly lower the liner metal temperature relative to that of the hot gases.

Figure 4:
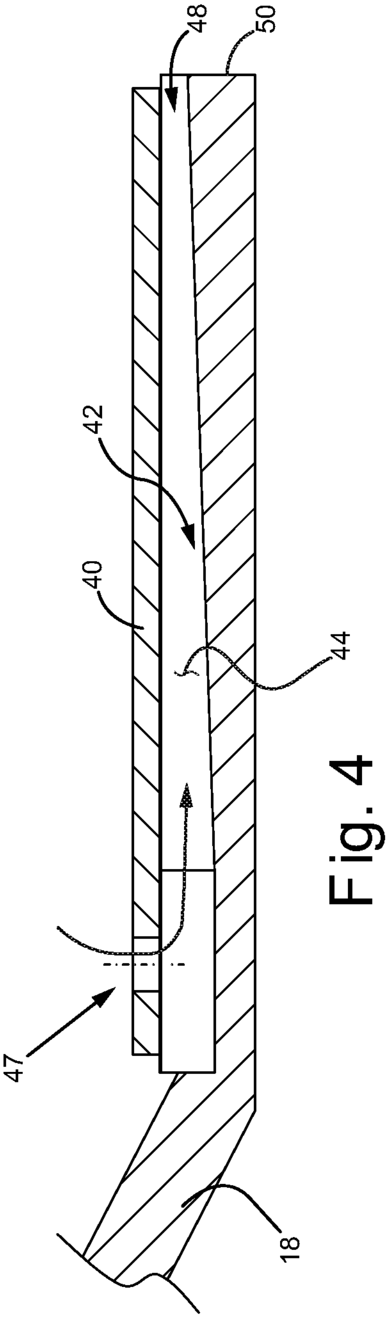
Fig. 4 Prior Art
FIG. 4 is a cross-sectional view of the aft portion of a prior art combustor liner.

Referring to FIG. 3, liner 18 has an associated compression-type seal 38, commonly referred to as a hula seal, mounted between a cover plate 40 of the liner aft end 50, and transition piece 14. More specifically, the cover plate 40 is mounted on the liner aft end 50 to form a mounting surface for the compression seal. As shown in FIG. 3, liner 18 has a plurality of axial channels 42 formed with a plurality of axial raised sections or ribs 44 all of which extend over a portion of aft end 50 of the liner 18. The cover plate 40 and ribs together define the respective airflow channels 42. These channels are parallel channels extending over a portion of the aft end of liner 18. Cooling air is introduced into the channels through air inlet slots or openings 46 at the forward end of the channels. The air then flows into and through the channels 42 and exits the liner through openings 48. Alternatively, or in addition, cooling air may enter the channels 42 through apertures or holes 47 in the cover plate 40. As shown in FIG. 4, the cross-section of the channel as defined by its height may decrease along the length of the channel in an aft direction.

As noted, the invention pertains to the design of a combustor liner used in a gas turbine engine and more specifically the cooled aft-end of the combustor liner as an improvement to the conventional structure shown in FIG. 4. As noted above, this area has conventionally been composed of axial grooves 42 machined into the liner 18 and a sheet metal cover 40 to support the aft-end Hula seal 38.

Figure 5:
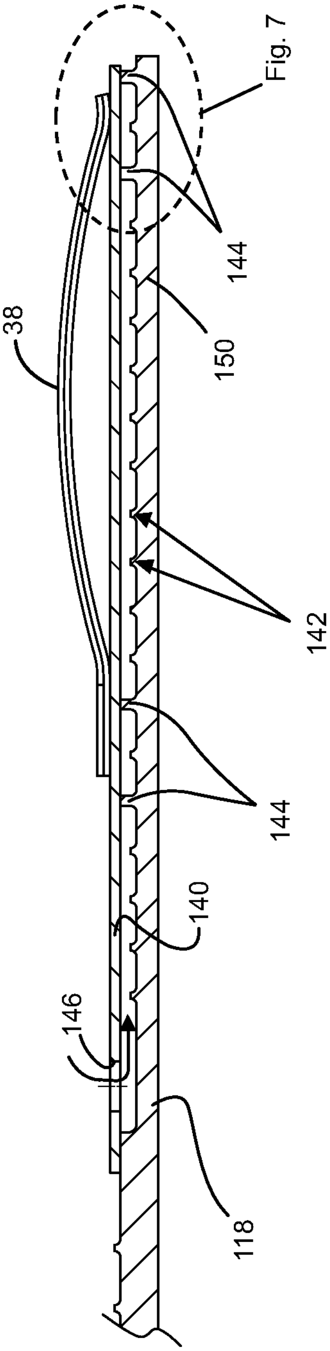
FIG. 5 is a cross-sectional view of a first embodiment of the aft portion of a combustor liner having circumferential turbulators and supports.
Figure 6:
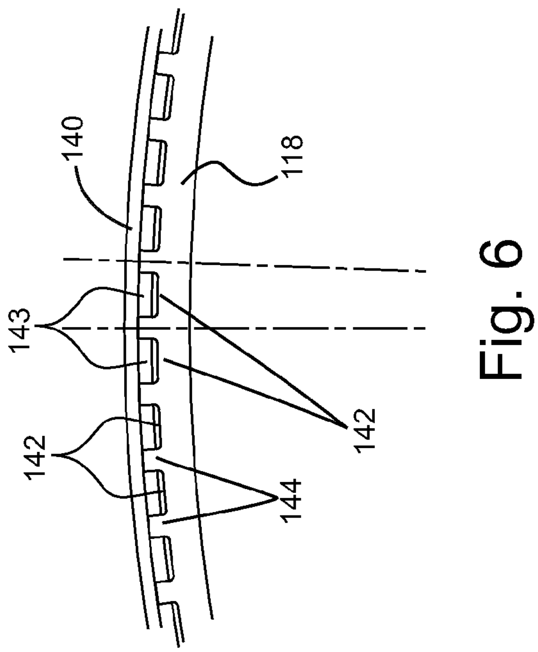
FIG. 6 is a schematic view of the aft portion of a combustor liner as illustrated in FIG. 5.
Figure 7:
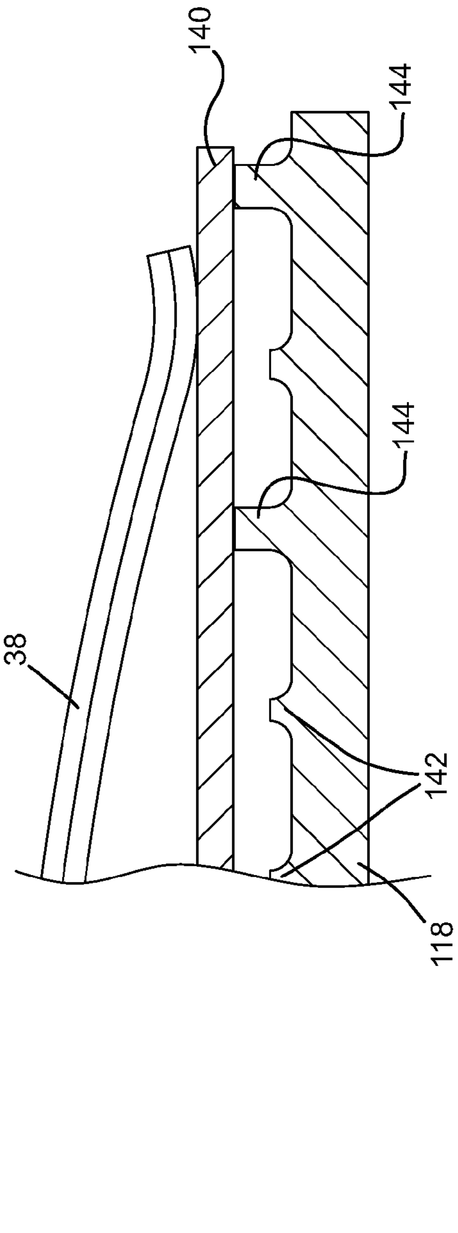
FIG. 7 is an enlarged cross-sectional view showing details of the encircled portion in FIG. 5.

According to an example embodiment of the invention, rather than providing axial grooves 42 as in the conventional combustor liner, an annular cooling system is provided that features transverse turbulators 142 as illustrated in FIGS. 5-7. As illustrated in FIG. 5, a sheet metal cover 140 is provided to support the aft-end Hula seal 38. The cover 140 defines an air passage with the liner aft-end 150. The sheet metal cover 140 includes air inlet apertures 146 for passage of cooling media to the region below the Hula seal 38. Spaced supports 144 are provided on the aft-end of the combustor liner 150 under the forward and aft ends of the Hula seal 38 to keep the sheet metal cover 140 spaced from the liner aft-end 150.

As illustrated in FIG. 6, although the supports 144 extend around the circumference of the liner 150, gaps 143 are formed between the individual supports 144, the gaps 143 being circumferentially spaced from one another about the axis of the combustor liner. In the illustrated embodiment, four axially spaced rows of supports 144 are provided, as shown in FIG. 5, each row comprised of a plurality of circumferentially spaced supports 144, as shown in FIG. 6.

Advantages of the illustrated design are many in comparison with the conventional design of FIG. 4 and include better heat transfer per unit air used, easier production than axial grooves from a machine/manufacturing standpoint; lower heat input to the temperature limited Hula seal; and an ability to achieve a lower temperature in the liner's aft end, which would be critical in engines with higher firing temperatures.

The transverse turbulators 142 provided according to an example embodiment of the invention are a highly effective heat transfer augmentation device. It is common to see heat transfer numbers of about 200% better than non-turbulated sections with the same quantity of cooling air. Therefore, by providing transverse turbulators 142 as proposed herein, it is possible to achieve the same amount of heat transfer as in the conventional structure with less cooling air. This would be a highly desirable feature in lean pre-mixed gas turbines because the cooling air can be used more effectively in other parts of the system. The transverse turbulators are expected to be more manufacturing friendly than the conventional axial channels because, in particular they are less sensitive to small variations in the manufacturing process then channeled flow.

As noted above, among current cooing systems are those composed of numerous axially extending cooling channels. These channels 42 are defined by walls that extend radially outward from the cold side of the liner aft end 50 to the sheet metal cover 40, as shown in FIG. 4. The cover 40 makes contact with and is supported by the top of the channel defining walls 44 (see U.S. Pat. No. 7,010,921). A significant amount of heat transfer flows through this assembly and into the Hula seal 38 that sits on top of the sheet metal cover 40.

The Hula seal's function is to act like a spring while maintaining a good seal. This part has a limited temperature capability and is often very close to its functional limit. The configuration proposed herein (FIGS. 5-7) helps limit the amount of heat transferred to the Hula seal by significantly reducing the contact area through which the heat can flow into the seal by limiting that contact area to the spaced supports 144.

Figure 8:
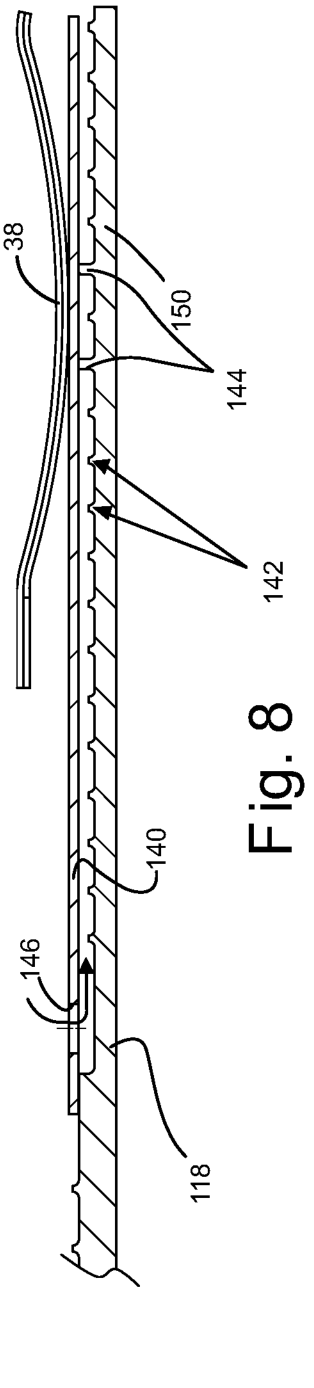
FIG. 8 is a cross-sectional view of a second embodiment of the aft portion of a combustor liner having turbulators and supports.

An alternate embodiment is illustrated in FIG. 8. In this embodiment, the Hula seal 38 is rotated 180° from the position it occupied in the embodiment illustrated in FIGS. 5-7. As a result, only the center arched portion of the seal 38 bears against the top of the cover 140. The ends of the Hula seal 38 would then bear against the forward end of the inner sleeve 14 of the transition piece 12.

This embodiment only requires two circumferential rows of supports 144 located under the arched center portion of the Hula seal 38. In still other embodiments, only a single circumferential row of supports may be provided under the arched center portion of the Hula seal 38. Because an embodiment as illustrated in FIG. 8 requires fewer circumferential rows of supports 144, the cost and time required to manufacture the combustor liner 150 can be reduced compared to the embodiment illustrated in FIGS. 5-7.

In addition, in this embodiment only one or two rows of the supports 144 would act to transfer heat from the combustor liner 150 to the cover plate 140, and then into the Hula seal. Thus, the embodiment illustrated in FIG. 8 provides even less of a pathway for heat to be transferred to the Hula seal 38, which should further serve to keep the Hula seal at a desirably low temperature. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustor for a turbine comprising:

a combustor liner;

a first flow sleeve surrounding said combustor liner with a first flow annulus therebetween, said first flow sleeve having a first plurality of cooling apertures formed about a circumference thereof for directing compressor discharge air as cooling air into said first flow annulus;

a transition piece body connected to said combustor liner, said transition piece body being adapted to carry hot combustion gases to the turbine;

a second flow sleeve surrounding said transition piece body, said second flow sleeve having a second plurality of cooling apertures for directing compressor discharge air as cooling air into a second flow annulus between the second flow sleeve and the transition piece body, said first flow annulus connecting to said second flow annulus;

an arch shaped resilient seal structure disposed radially between an aft end portion of said combustor liner and a forward end portion of said transition piece body, wherein a center portion of the arch shaped resilient seal structure faces the combustor liner, and ends of the arch shaped resilient seal structure bear against an inner surface of the transition piece body; and a cover sleeve disposed between said aft end portion of said combustor liner and said resilient seal structure, an air flow passage being defined between said cover sleeve and said aft end portion of said combustor liner, said cover sleeve having at a forward end thereof a plurality of air inlet apertures for directing cooling air from said first or second flow annulus into said air flow passage, a radially outer surface of said combustor liner aft end portion defining said air flow passage including a plurality of turbulators projecting towards but spaced from said cover sleeve and a plurality of circumferentially extending rows of supports extending to and engaging said cover sleeve to space said cover sleeve from said turbulators to define said air flow passage, wherein said plurality of circumferentially extending rows of supports are disposed at a position substantially aligned with the center portion of the arch shaped resilient seal structure.

2. The combustor of claim 1, wherein an aperture is provided between each adjacent pair of the supports such that cooling air flowing along the air flow passage can pass through the apertures to flow past a circumferentially extending row of the supports.

3. The combustor of claim 1, wherein the turbulators comprise raised portions of the combustor liner that extend around the circumference of the combustor liner.

4. The combustor of claim 1, wherein the turbulators comprise raised circumferential rings of material that extend from the combustor liner toward the cover sleeve.

5. The combustor of claim 1, wherein said resilient seal structure is a Hula seal.

6. The combustor of claim 1, wherein said first plurality of cooling apertures are configured with an effective area to distribute about 40-60% of the compressor discharge air to said first flow annulus.

7. A turbine engine comprising the combustor of claim 1.

8. A method of cooling a transition region of a turbine engine located between a combustion section having a combustor liner and a transition piece body, said transition region including an arch shaped resilient seal structure disposed radially between an aft end portion of said combustor liner and a forward end portion of said transition piece body, the center of the arch shaped resilient seal structure facing the combustor liner, the method comprising:

configuring said aft end portion of said combustor liner so that a radially outer surface thereof includes a plurality of radially outwardly projecting turbulators and a plurality of circumferentially extending rows of radially outwardly projecting supports having a radial height greater than that of said turbulators, wherein said plurality of circumferentially extending rows of supports is aligned with the center of the arch shaped resilient seal structure;

disposing a cover sleeve between said aft end portion of said combustor liner and said arch shaped resilient seal structure to define an air flow passage between said cover sleeve and said aft end portion of said combustor liner, said cover sleeve having at a forward end thereof a plurality of air inlet apertures for directing cooling air into said cooling air passage, said turbulators projecting towards but being spaced from said cover sleeve and said supports extending to and spacing said cover sleeve from said turbulators to define said air flow passage; and supplying compressor discharge air to and through said air inlet apertures and through said air flow passage to reduce a temperature in a vicinity of said resilient seal.

9. A method as in claim 8, wherein the center portion of the arch shaped resilient seal structure bears against the cover sleeve, and wherein ends of the arch shaped resilient seal structure bear against the transition piece body.

10. A method as in claim 8, wherein said resilient seal structure is a Hula seal.

11. The method as in claim 8, wherein the plurality of radially outwardly projecting turbulators are arranged in circumferential rings on the combustor liner.

12. The combustor of claim 1, wherein the plurality of circumferentially extending rows of supports comprise raised portions of the combustor liner that extend around the circumference of the combustor liner.

13. The combustor of claim 1, wherein each of the circumferentially extending row of supports comprises raised portions of the material forming the combustor liner, the raised portions extending radially outward toward the cover sleeve, wherein an aperture is provided between each adjacent pair of raised portions, and wherein the raised portions form a circumferential ring around the exterior of the combustor liner.

14. The method as in claim 8, wherein the configuring step comprises configuring the aft end portion of said combustor liner so that the plurality of circumferentially extending rows of supports comprise raised portions of the combustor liner that extend around the circumference of the combustor liner.

15. The method as in claim 8, wherein the configuring step comprises configuring the aft end portion of said combustor liner so that each of the plurality of circumferentially extending rows of supports comprises raised portions of the material forming the combustor liner, the raised portions extending radially outward toward the cover sleeve, wherein an aperture is provided between each adjacent pair of raised portions, and wherein the raised portions form a circumferential ring around the exterior of the combustor liner.

* * * * *

UNITED STATES PATENT AND TRADEMARK OFFICE

CERTIFICATE OF CORRECTION

PATENT NO. : 8,544,277 B2
APPLICATION NO. : 13/018886
DATED : October 1, 2013
INVENTOR(S) : Johnson et al.

It is certified that error appears in the above-identified patent and that said Letters Patent is hereby corrected as shown below:

In the Specification

At column 4, line 38, insert --16-- between "the impingement sleeve" and "(or second flow sleeve)"

At column 5, line 23, insert --44-- between "and ribs" and "together"

Signed and Sealed this
Nineteenth Day of November, 2013

Teresa Stanek Rea
*Deputy Director of the United States Patent and Trademark Office*